Aug. 17, 1948.   H. R. DENTON   2,447,235
MACHINE FOR MAKING CONTAINERS
FROM PULPY FIBROUS MATERIAL
Filed Feb. 20, 1945   5 Sheets-Sheet 2
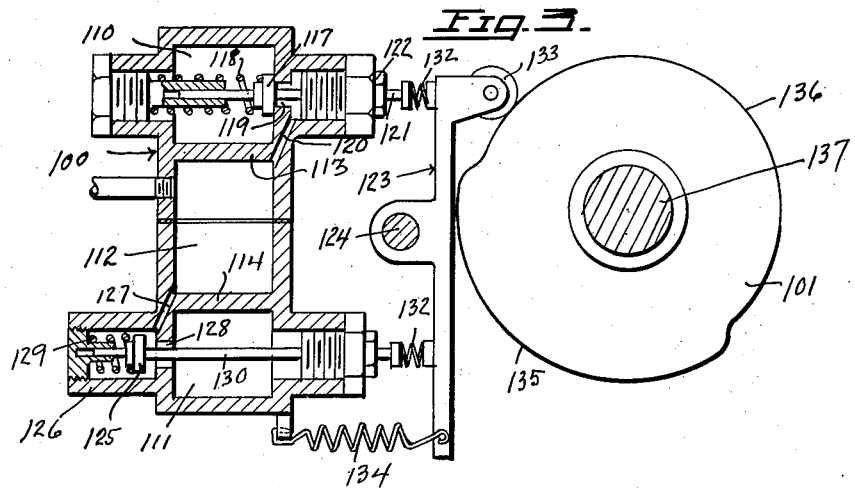
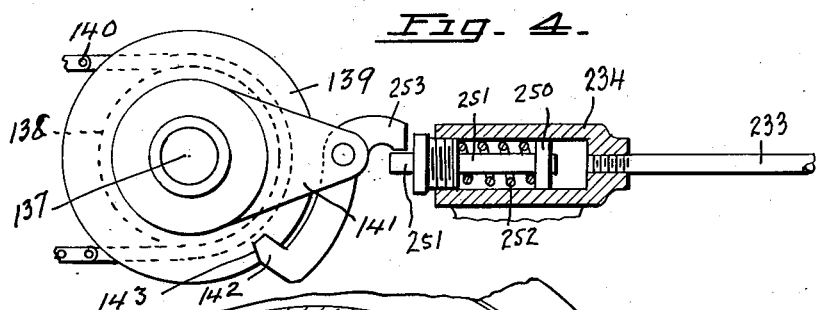
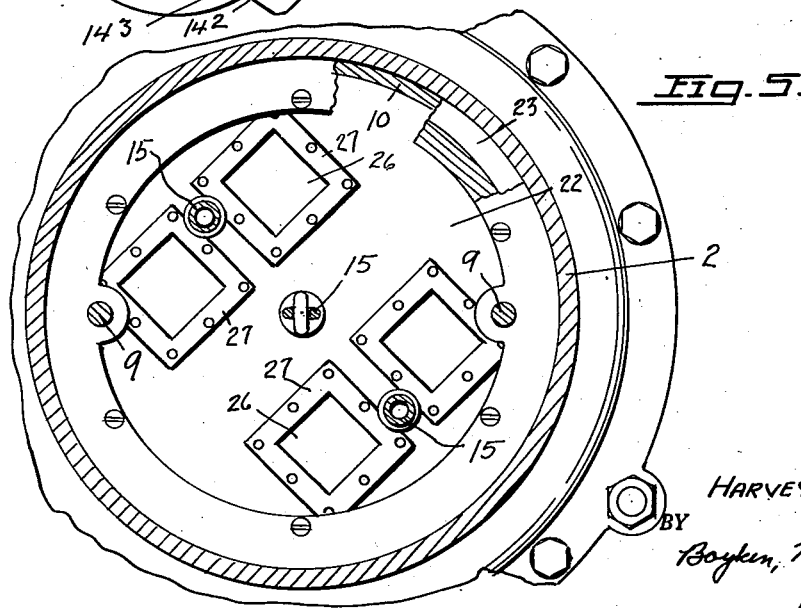
INVENTOR.
HARVEY R. DENTON
BY
Boyken, Mohler & Beekley
ATTORNEYS.

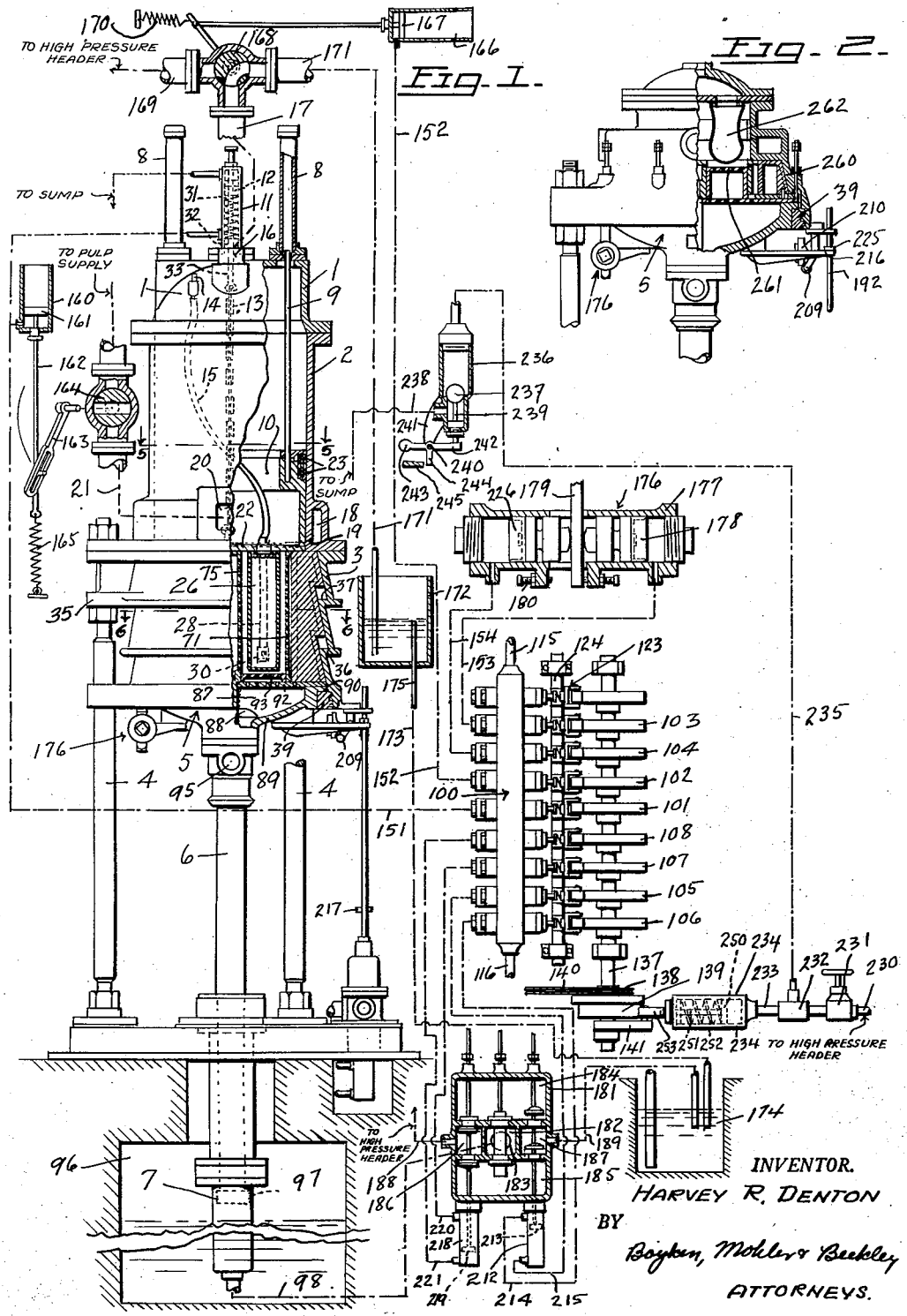

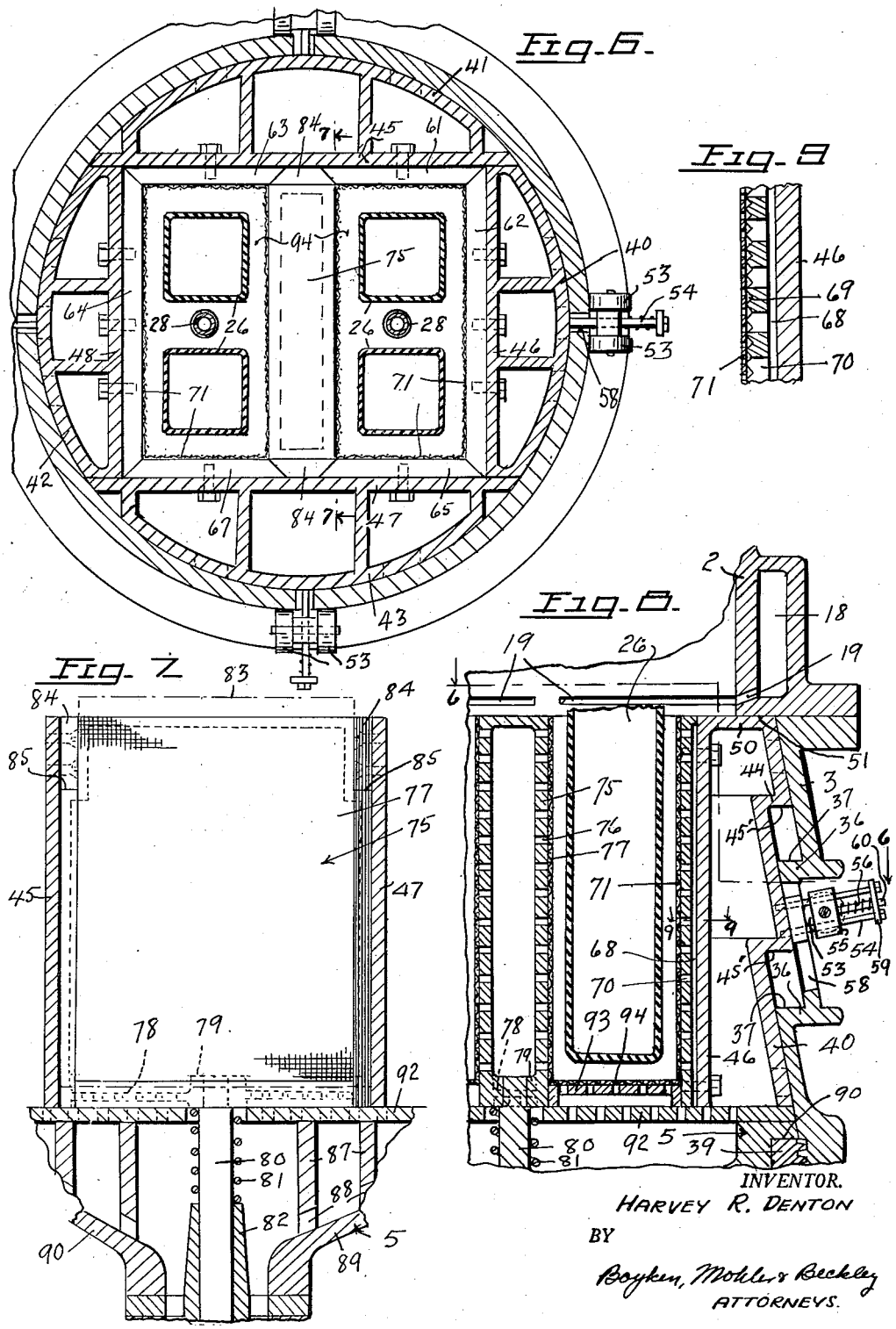

Aug. 17, 1948.                    H. R. DENTON                    2,447,235
                      MACHINE FOR MAKING CONTAINERS
                        FROM PULPY FIBROUS MATERIAL
Filed Feb. 20, 1945                                     5 Sheets-Sheet 4
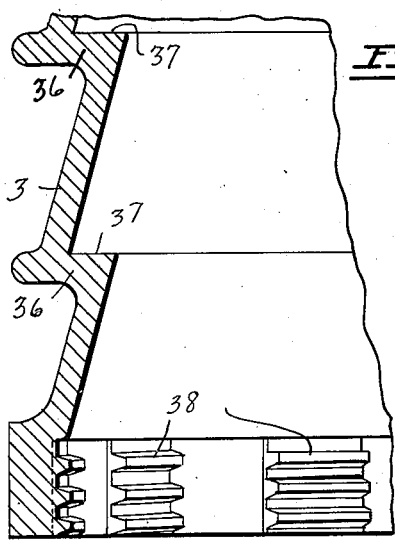
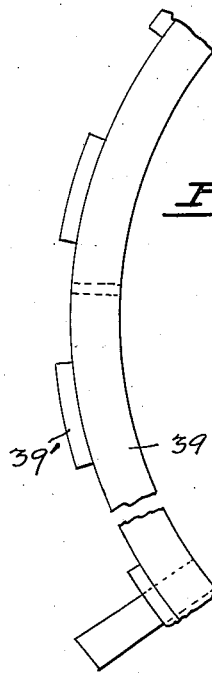
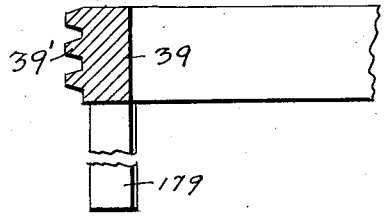
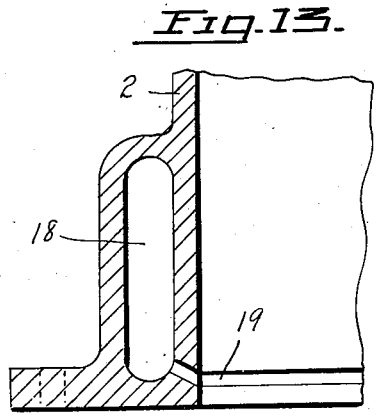
INVENTOR.
HARVEY R. DENTON
BY
Boykin, Mohler & Beckley
ATTORNEYS.

Aug. 17, 1948.  H. R. DENTON  2,447,235
MACHINE FOR MAKING CONTAINERS
FROM PULPY FIBROUS MATERIAL
Filed Feb. 20, 1945  5 Sheets-Sheet 5
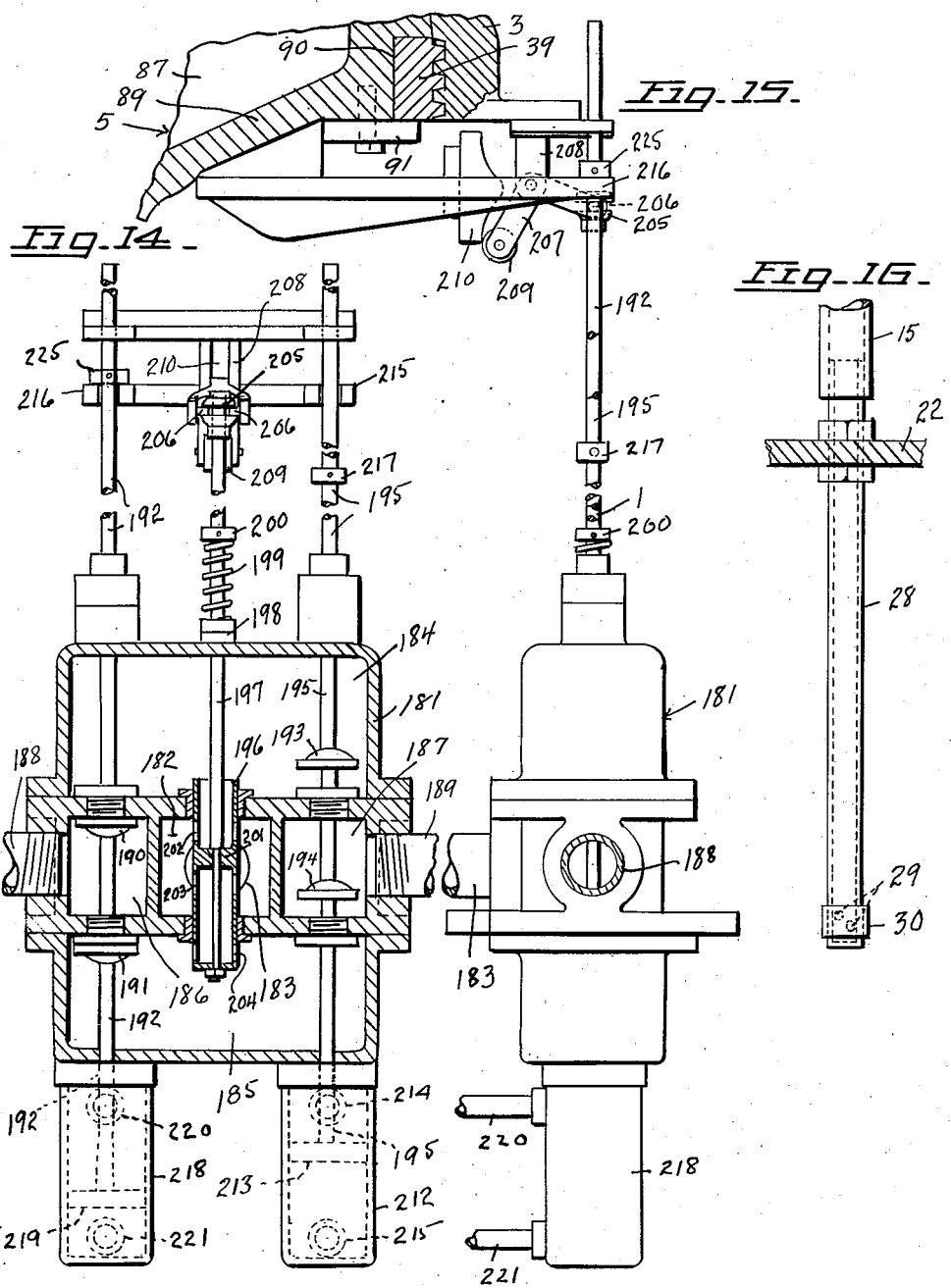
INVENTOR.
HARVEY R. DENTON
BY
Boyken, Mohler & Beckley
ATTORNEYS.

Patented Aug. 17, 1948

2,447,235

UNITED STATES PATENT OFFICE 2,447,235

MACHINE FOR MAKING CONTAINERS FROM PULPY FIBROUS MATERIAL

Harvey R. Denton, Oakland, Calif., assignor to Moist-R-Proof Container Co., San Francisco, Calif., a corporation of California Application February 20, 1945, Serial No. 578,902

13 Claims. (Cl. 92—60)

This invention relates to a machine for making containers from pulpy fibrous material such as papier-mâché, or the like.

One of the objects of the invention is a machine that is more efficient than those heretofore employed for making containers from paper pulp and the like, and which machine also produces containers that are more uniform and stronger than those heretofore made.

Heretofore one of the greatest drawbacks in making containers from paper or fibrous pulp has been the slowness of fabrication and other drawbacks have been the lack of uniformity in the thickness of the walls of containers and their lack of strength. The most commonly adopted machines use the suction method of depositing the fibers on the walls of the mold forms and of extracting the moisture from the fibers. Others use pressure, but in no instance of which I am aware is there the essential combination of speed of manufacture, and uniformity and adequate strength in the walls of the containers.

This invention is the pressure type of machine and it accomplishes the desired results of speed of manufacture and uniformity and adequate strength in the containers produced by it, thereby overcoming the objections in previous machines intended for the same purpose.

Other objects and advantages will appear in the drawings and description.

In the drawings, Fig. 1 is a semi-diagrammatic view of the machine in which certain elements required in its successive operations are illustrated detached from the body of the machine for clarity, the detached parts being diagrammatically connected with the body of the machine by lines indicating hydraulic and pulp circuits.

Fig. 2 is a fragmentary part-sectional part-elevational view of a lid making machine which differs only slightly from the machine of Fig. 1. The only differences are seen in Fig. 2.

Fig. 3 is an enlarged sectional view through the main hydraulic control device for controlling the principal movements of the machine.

Fig. 4 is a part-sectional part-elevational view of the cam drive for the hydraulic control device of Fig. 3 including a safety throw-out apparatus that functions only in the event the mold in the main machine closes improperly.

Fig. 5 is a part-sectional part-elevational view taken substantially along line 5—5 of Fig. 1.

Fig. 6 is a horizontal sectional view taken through the walls of the mold chamber but with the container form-walls shown in elevation.

This view is substantially along line 6—6 of Fig. 1 or line 6—6 of Fig. 8.

Fig. 7 is a fragmentary sectional view taken substantially along line 7—7 of Fig. 6, to show the central container form-wall.

Fig. 8 is a fragmentary sectional view through one of the container forms including the central wall of Fig. 7 and the guide means and outer housing.

Fig. 9 is an enlarged fragmentary view taken along line 9—9 of Fig. 8.

Fig. 10 is an enlarged fragmentary sectional view taken through the outer housing that encloses the container form-walls during a compression of the pulp, which view shows the interrupted threads for the locking ring.

Fig. 11 is a fragmentary plan view of the locking ring showing the interrupted threads intended for engagement with the threads shown in Fig. 10.

Fig. 12 is a fragmentary sectional view through the locking ring of Fig. 11, showing a projection thereon that is adapted to control the safety device of Fig. 4.

Fig. 13 is an enlarged fragmentary sectional view through the pulp duct showing the inlet for admitting pulp into the mold forms for compression.

Fig. 14 is a part-sectional part-elevational view through a valve control mechanism that is actuated by the rising and falling ram that carries the container form side walls.

Fig. 15 is a part-sectional part-elevational view of the valve control mechanism of Fig. 14.

Fig. 16 is an enlarged elevational view of one of the valved air ejection tubes adapted to admit air into the mold forms.

In detail, referring mainly to Fig. 1, the machine illustrating the present invention comprises a cylinder head 1 at the top of the machine bolted to a cylinder 2 therebelow. The cylinder 2 is in turn bolted onto a mold jacket 3 that is supported on standards 4. A pressure plate 5 that is normally locked to the lower end of jacket 3 is the main head portion of a vertically reciprocable ram, the rod 6 of which has a piston at its lower end reciprocable in the ram cylinder 7.

The cylinder head 1 is provided with a plurality of guide cylinders 8 extending vertically therefrom for guide rods 9 that are secured to a piston 10 that is reciprocable in cylinder 2. The head 1 further carries an upstanding cylinder 11 centrally thereof, which cylinder carries a vertically reciprocable elevator piston 12 therein, said elevator piston being connected with piston 10 by a chain 13. One or more air inlet tubes 14 are also carried by head 1, which tubes are each connected within the head with a flexible air line 15 for a purpose later to be described in connection with the piston 10 and a high pressure water inlet 16 connected with a high pressure water line 17 opens into the upper end of cylinder 2 through head 1.

Cylinder 2 is coaxial with head 1 and is secured thereto in any suitable manner. Around the lower end of said cylinder is a passageway 18 that opens into the cylinder at a point very close to its lower end through slots 19 that are around the sides of the cylinder-like segments of an annular slot (Figs. 8, 13). This passageway is for the admission of pulpy fibrous material below the piston 10, although at its lowest point in the cylinder 2, the said piston extends over the slots 19 closing them. One or more inlets 20 open into the passageway 18 for admitting said pulp into the same, and a conduit 21 conducts such pulp to each such inlet from a source of supply (Fig. 1).

The piston 10 that is within cylinder 2 has a head 22 at its lower end and a skirt extending upwardly from said head carries a sealing ring or rings 23.

The head 22 of this piston provided with four rectangular apertures arranged in two pairs at opposite sides of the central axis of the piston, in each of which is secured a depending elastic mold core 26 that may be of any elastic material that is impervious to water and that is relatively strong (Figs. 5, 6, 8). The view in Fig. 5 is slightly turned on the axis of the piston relative to the view of Fig. 6 inasmuch as this is actual relation of the opening to the axis of the machine illustrated in Fig. 1 in which the guide bars 9 are in a vertical plane perpendicular to the line of vision. The view of Fig. 6 is slightly turned relative to that of Fig. 5 so that the cores will be seen in symmetrical arrangement with respect to the observer.

The cores 26 open at their upper ends into the area within cylinder 2 above the piston and piston head 22, and said cores may be clamped in any suitable manner, as by frames 27 (Fig. 5) to the head 22.

Between the cores of each pair is a rigid tube 28. Each tube 28 is carried by head 22 at its upper end and said upper end also connects with the flexible air line 15. The lower end of each tube is closed, but the sides may be apertured at 29 for discharge of air. Said apertures are preferably covered by an annular elastic band 30, thereby providing a check valve at said lower end of each tube that is adapted to permit atmospheric air to pass outwardly of each tube, but which prevents a flow of air or any other fluid in an opposite direction (Fig. 16).

Piston 10 and cores 26 are floatingly arranged in cylinder 2. When it is at the lowest point in its travel the chain 13 is taut, and is yieldably held taut by reason of coil spring 31 in the small elevator cylinder 11 that is carried on the cylinder head 2, said spring reacting between the piston 12 in said cylinder and any suitable stop 32 in the lower end of the cylinder. The piston 12 is connected to the chain 13 by a piston rod 33 that may extend through stop 32 and a suitable packing gland at the juncture between the cylinder 11 and head 1.

The mold jacket 3 is coaxial with cylinder 2 and is secured to the latter by any conventional means such as bolts. The said jacket is circular in cross section, except for external projections such as lugs 35 for standards 4. It is not truly cylindrical, however, but is formed with a plurality of superposed downwardly and outwardly inclined sections in which the smaller upper ends of each section are joined to the larger diameter lower end of the upper section by an annular flange 36 (Figs. 8, 10). Thus there is an upwardly facing shoulder 37 within the mold jacket at the juncture between each pair of adjacent sections.

The lower end of the mold jacket 3 is provided internally with interrupted threads 38 (Fig. 10). These threads are adapted to be engaged by similar but external threads 39' on an annular locking ring 39 that is rotatably secured onto the upper end of the pressure plate 5.

Within the mold jacket 3 are four hollow members that have outer walls 40, 41, 42, 43 (Fig. 6) that are slidable up and down against the slanted inner sides of the sections forming the sides of the mold jacket. These outer walls have sections formed like the sections of the mold jacket, and flanges 44 connect adjacent pairs of such sections (Fig. 8) thus providing external downwardly facing shoulders 45' at the junctures between sections, which shoulders are in opposed relation to shoulders 37 on the mold jacket.

The external contour of the four outer walls 40 to 43 corresponds with curve of the circular contour of the mold jacket. However, spaced from the inwardly facing sides of walls 40, 42, which pair are generally opposed to each other, are parallel flat plates 46, 48 that are integrally connected with walls 40, 42 respectively (Fig. 6). And spaced inwardly of walls 41, 43 are parallel flat plates 45, 47 that are integral with walls 41, 43 respectively. Plates 46, 48 are shorter than plates 45, 47 and are slidable toward and away from each other between the ends of plates 45, 47. The upper end of each flat inner wall of each of the four hollow members is connected integrally with the curved outer plate adjacent thereto by a flat horizontal wall 50 (Fig. 8), and each wall 50 is adapted to extend over and to engage the flat downwardly facing surface 51 of the lower end of cylinder 2 when the hollow members are at the top of their movement against the inner inclined sides of the mold jacket.

When said hollow members are at the upper ends of their movement and walls 50 engage surfaces 51, the opposed shoulder surfaces 37, 45' on the hollow members and mold jacket are spaced a substantial distance apart, and the flat inner plates 45, 47 and 46, 48 are at their minimum distances from each other. Any downward movement of the hollow members against the inner inclined sides of the mold jacket will result in said plates 45, 47 and 46, 48 moving apart.

The walls 40 to 43 of the hollow members are held against the inner surfaces of the mold jacket by rollers 53 (Figs. 6, 8). A pair of these rollers is carried by each of the walls 40, 44 by posts 54 that extend through a slot 58 in the wall jacket adjacent each of said walls. The posts 54 for each pair of rollers carries a bearing 55 on which each pair of rollers 53 is supported, and a spring 56 yieldably urges each bearing inwardly. As the rollers run on the outer sides of the mold jacket at opposite sides of each slot 55 the walls 40 to 44 are yieldably held in contact with the inner sides of the mold jacket at a uniform pressure at all times during sliding of said walls upwardly and downwardly against said mold jacket. The outer ends of posts 54 are secured together by a cross bar 59 through which a post 60 that is on bearing 55 is slidable. The spring 56 is around said post 60 and reacts between the bearing 55 and said crossbar (Fig. 8).

Secured rigidly to the inner sides of plates 46, 48 is one of the side walls 62, 64 respectively of a pair of mold forms for one of the walls of a pair of containers, while a pair of end walls 61, 63 for forming one of the end walls of each such pair of containers is secured to plate 45 and a similar pair of end walls 65, 67 are secured to plate 47. These walls 61, 62, 63, 64, 65 and 67 are spaced from the plates 45 to 48 inclusive, to provide vertical drain channels 68 for water and they are vertically grooved as at 69 on their inner sides to also form drain channels. The walls themselves are formed with perforations 70 and a very finely perforated metal plate or fine mesh screen 71 is secured against the said inner sides of each of the walls 61, 62, 63, 64, 65 and 67 (Fig. 9).

Walls 61, 63 form one pair on plate 45, while walls 65, 67 form a similar pair on plate 47. The walls 63, 67 are opposed to each other and walls 61, 65 are in opposed relation. The form walls 61, 65 adjoin the end edges of wall 62 and the adjoining edges of walls 61, 65 and 62 are beveled so that a close fitting joint is provided when the hollow members carrying said walls are at the inner end of their lateral movement.

Walls 63, 67 and wall 64 have beveled adjoining edges the same as already described for walls 61, 65 and 62.

When the hollow members carrying the form walls are at the inner end of their lateral movement so that the beveled edges of the walls above described are in close fitting engagement, there is a space between the walls 61, 63 and walls 65, 67. The adjacent edges of each of these pairs of walls are beveled and a hollow central wall 75 (Figs. 6, 7, 8) parallel with walls 62, 64 extends between plates 45, 47. The end edges of this hollow central wall are beveled to correspond with the beveled adjacent edges of the pairs of form walls 61, 63 and 65, 67 to fit against the beveled surfaces of said pairs of walls. The opposed sides of the hollow wall 75 are perforated as at 76 and grooved on their outer sides the same as the other form walls, and finely perforated plates or screens 71 are secured against said outer sides.

The central hollow wall 75 has a perforated lower end 78 for draining of water from between the opposite sides thereof, and centrally of said lower end is a vertically apertured boss 79 in which is slidably secured the upper end of a shaft 80 so that said hollow wall may reciprocate vertically on said upper end. A spring 81 reacts between said hollow wall and the hub 82 of a spider that is secured within the lower end of pressure plate 5 at about the juncture between said plate and the ram rod 6. The vertical movement of said central wall under the influence of said spring, when said wall is released, is relatively slight. Dot-dash line 83 above the central wall, as seen in Fig. 7, indicates about the limit of said movement.

The said central wall is held down in its depressed position by lugs 84 that are secured to the opposed sides of the plates 45, 47 (Fig. 7) and which lugs rest on shoulders 85 formed on the end edges of the said hollow wall. It will be seen that as the ram 6 descends, to carry the central partition downwardly away from said lugs 84, the central partition will be free to rise under the influence of spring 81.

The pressure plate 5 generally in the form of a funnel is interiorly formed with cross ribs 87 (Fig. 7) that are apertured at 88 adjacent the tapered walls 89 of the pressure plate. The plate 5 is formed circumferentially with a radially outwardly and downwardly opening recess 90 (Figs. 1, 8, 15) in its upper edge for rotatably supporting the locking ring 39, and any suitable lugs or supports 91 (Fig. 15) may be provided on the pressure plate at spaced points for supporting the ring 39 in its recess 90.

On the ribs 87 and upper edges of the pressure plate 5 is a perforated cover plate 92 on which the form walls 61, 62, 63, 64, 67 are supported at their lower edges and with which the lower edge of the central hollow wall 75 is in engagement when the pressure plate is at the upper limit of its vertical movement. On this cover plate 92 are perforated bottom form walls 93 (Figs. 6, 8) that form the bottoms of the two mold forms that are above said pressure plate. Each of these mold forms has a finely perforated plate or fine mesh screen 94 on its upper side. The plates or screens 94 correspond with the inner plates or screens 71 on the side walls of the mold form walls 61, 62, etc. These bottom mold form walls are secured to the cover plate 92 and the latter is in turn secured to the pressure plate, hence said walls and cover plate will move as a unit with the pressure plate.

The funnel-shaped walls 89 of the pressure plate lead to a central drain around the hub 82 (Fig. 7) and one or more ports 95 communicating with said central drain (Fig. 1) may be connected by any suitable flexible conduit (not shown) with sump 96 for draining into said sump.

The ram rod 6 has a piston 97 (Fig. 1) on its lower end that is vertically reciprocable within cylinder 7, and the lower end of said cylinder communicates with a high pressure water pipe or conduit 98 through which water is admitted or discharged, as the case may be, for raising or lowering the pressure plate 5 and the members carried thereon.

The main hydraulic control means for controlling the movement and action of the various parts of the machine is an elongated housing 100 (Figs. 1, 3) within which are inlet and discharge valves that are respectively operated by cams 101 to 108 inclusive. These are indicated in Fig. 1, and a typical detailed structure of one of said cams, such as 101, and the valves operated thereby is indicated in Fig. 3; it being understood that the cams will vary from each other in the relative lengths of their high and low points to produce the desired intervals between opening and closing of the valves for the particular operations to be performed. However, all the cams have high and low portions and the only differences between them is in the circumferential lengths of such portions and their positions relative to each other.

The housing 100 is interiorly separated longitudinally thereof into a high pressure chamber 110 and a discharge chamber 111 (Fig. 3), while between them are separate chambers 112 for each pair of valves adjacent thereto; there being a pair or set of valves for each of the cams 101 to 108 inclusive. A partition wall 113 separates chambers 112 from high pressure chamber 110 while a partition 114 separates the chambers 112 from the discharge chamber 111. A high pressure conduit 115 connects with one end of chamber 110 and a discharge conduit 116 connects with one end of chamber 111 (Fig. 1).

Referring back to Fig. 3, the high pressure valve of each pair of valves for each cam is indicated at 117 in closed position. This valve is closed by a spring 118 against port 119, which port communicates in turn with passageway 120 leading into chamber 112. When the valve is opened the high pressure water in chamber 110 will be directly admitted through port 119 and passageway 120 into chamber 112 so that any conduit leading from chamber 112 will conduct the high pressure water to the element to be actuated thereby.

A valve rod 121 on which valve 117 is secured, extends through a packing box 122 to outside the housing 100 where it is adapted to be engaged by one end of a rocker arm 123. Rocker arm 123 is rotatably supported on a shaft 124 for rocking thereon, the said shaft being parallel with housing 100.

Each discharge valve is as indicated at 125 (Fig. 3) and each is spaced within a hollow extension 126 on one side of housing 100. A passageway 127 communicates with the interior of the extension 126 and a port 128 communicates between the interior of said extension and the discharge chamber 111. Valve 125 is yieldably urged toward a position closing port 128 by a spring 129 in said extension. The valve rod 130 on which valve 125 is carried extends through a stuffing box for engagement by the end of rocker arm 123 that is opposite the one that engages rod 121.

A spring 132 is preferably interposed between each end of the rocker arm and each valve rod.

The rocker arm carries a cam follower 133 at its end that is over valve rod 121, and which follower is held at all times in yieldable engagement with each cam that is adjacent thereto by means of a spring 134 that connects the opposite end of the rocker arm with the housing.

Each cam, like cam 101, has a high portion or surface 135 and a low surface 136, and the cams are all secured on cam shaft 137. When the follower 133 of each cam is on the low surface 136 of said cam, the discharge valve is opened under the influence of spring 134 and the high pressure valve 117 is closed. When the cam follower is on the high surface 135 the discharge valve 125 is closed and the high pressure valve 117 is opened.

The cam shaft 137 carries a sprocket 138 that is revolvable thereon, and rigid with said sprocket is a disk 139 (Fig. 4). Sprocket 138 is connected by chain 140 with a motor (not shown) for revolving disk 139 at the desired speed in a clockwise direction as seen in Fig. 4.

An arm 141 is secured rigidly on shaft 137 and which arm has a dog 142 piovtally secured to its outer end, said dog being adapted to swing into a recess 143 formed in disk 139 whereby the cam shaft 137 will be locked to the sprocket 138 for driving by the latter as long as dog 142 is in recess 143, but if the dog is swung out of the recess 143, then the sprocket will continue to revolve, but the shaft 137 will remain stationary.

As before stated, each of the chambers 112 of the control means may be connected by a pipe or conduit with the particular hydraulically actuatable means to be actuated as will now be explained, together with the several means to be actuated.

With the apparatus ready to commence a cycle of operation, the cam 101 (Fig. 3) is substantially at the point where the high pressure valve 117 will be opened. Upon opening said valve by cam 101, and closing of the discharge valve 125, the water under high pressure will enter chamber 112 from which it will be conducted by a high pressure conduit 151 to one end of a cylinder 160 in which is a piston 161. The piston 161 connects by a rod 162 with an arm 163 on a valve 164 that is in the pulp supply line 21. The movement of piston 161 under the influence of the high pressure water causes valve 164 to open for permitting the fibrous pulp to enter the mold forms as soon as the piston 10 is sufficiently elevated to clear the pulp inlet slots 19.

The high pressure line 151 continues to the inlet at the lower end of the cylinder 11 that is on the cylinder head 1, and is admitted to below the piston 12 in said cylinder. Thus, almost simultaneously with opening of valve 164, the elevator piston 12 is moved upwardly carrying piston 10 with it by reason of chain 13. This upward movement of the piston 10 is sufficient to clear slots 19 and the mold forms above the pressure plate 5 are filled with pulp.

The mold forms will be filled by the time the high surface on cam 101 is passed, whereupon the high pressure valve will be closed and the discharge valve opened. The valve 164 will then automatically close under the influence of spring 165 that is connected with the piston rod 162. The water in the cylinder 160 will be drained into the discharge chamber 111 and any water that might pass the elevator piston 12 in the cylinder 11 will drain into sump 96 at any time, while the water below said piston will be free to drain into discharge chamber 111 until the discharge valve 125 is closed again.

The next step is admitting water under high pressure into the cylinder 2 above piston 10 so as to lower the piston 10 to a point where its lower side is flush with the opposite edges of the mold forms 61, 62, etc., including hollow wall 75. Thus high pressure water will enter the elastic cores 26 causing them to expand for expressing the water from the mold forms and for compacting the fibers in the pulp against the form walls.

The admission of said water into cylinder 2 is accomplished by cam 102 that opens conduit 152 to high pressure water. This high pressure water is admitted into cylinder 166 and piston 167 is moved by said water for opening valve 168 to pass high pressure water from supply pipe 169 into line 17 that connects with inlet 17. As soon as the high point on cam 102 is passed, the valve 168 is closed under the influence of spring 170 and the water in line 152 is drained into the discharge chamber 111. By this time the containers of fibrous pulp have been formed, and as valve 168 is a two-way valve, its closing of communication between the high pressure line 169 and conduit 17 is succeeded immediately by an opening of the conduit 17 to discharge line 171 and the water above piston 10 is siphoned into siphon tank 172, from which it is conducted through line 173 into sump 174. The vertical adjustment of discharge pipe 175 as to the level of its upper end determines the degree of siphoning action through line 171.

The siphoning of water from cylinder 2 results in collapse of cores 26 so as to space them from the wall forms, and to facilitate this collapse without danger of injuring the containers through a vacuum action or suction, air may be forceably ejected into the mold forms through the air lines 15 and tubes 28 (Figs. 6, 16), or the mere opening of the tube 28 to atmospheric pressure is generally sufficient to avoid any injury to the molded containers.

After the molding of the containers, the next step is to free them from the mold forms. The locking ring 39 that carries the threads 39' must first be unlocked, and this is accomplished by cams 103, 104 and a hydraulic device 176 (Fig. 1).

The cam 103 opens the conduit 153 to high pressure water and this conduit communicates with one end of a cylinder of said device 176, thereby urging piston 178 in said cylinder against an arm 179 that depends from the locking ring 39 (Figs. 1, 12). An adjustable stop 180 on said cylinder stops rotation of the ring when it is fully unlocked. The water in the opposite end of the cylinder 177 is drained through line 154 into the discharge chamber 111 by action of cam 104; the said cams 103, 104 being arranged so that the high surface of one opens the conduit 153 to high pressure water, while the low surface of cam 104 opens conduit 154 to draining, and vice versa.

Upon the locking ring being unlocked the pressure plate 5 with the containers supported thereon descends quickly of its own weight. The line 98 that is at the lower end of the cylinder 7 is opened to discharge through a control box 181 that carries a plurality of control valves therein (Figs. 1, 14, 15).

The line 98 from the lower end of cylinder 7 enters a central chamber 182 in said box 181 through an inlet 183. Above chamber 182 is a chamber 184, and below chamber 182 is a chamber 185. At one side of said central chamber is a chamber 186 and a chamber 187 is at the other side.

A high pressure water line 188 communicates at all times with the chamber 186, while chamber 187 is at all times in communication with sump 174 for draining into said sump through line 189.

The top and bottom walls of chamber 186 are ported and are provided with valves 190, 191. These valves are secured on a rod 192 for simultaneous movement to open and closed positions. Valve 190 opens and closes the port into chamber 184 and valve 191 opens and closes the port into chamber 185 (Fig. 14).

The top and bottom walls of chamber 187 are ported similar to the upper and lower walls of chamber 186 and said ports are provided with valves 193, 194 that are secured on a rod 195 for simultaneous operation to open and to closed position.

The valves 190, 191 on rod 192 are adapted to open on the down stroke of rod 192, while the valves 193, 194 are adapted to open on the upstroke of the rod 195.

Vertically reciprocable through the upper and lower walls of the central chamber 182 is a hollow, cylindrical slide valve 196 that functions as a throttle valve for slowing down movement of the ram carrying the pressure plate 5, just after said plate commences its downward movement, and just as it about reaches its uppermost position.

The throttle valve 196 secured to the lower end of a rod 197 which rod extends upwardly from box 181 through a packing box 198. A spring 199 above said box reacts between the same and a collar 200 for yieldably supporting said valve in its normal inoperative position.

This sleeve valve 196 is formed with a partition 201 intermediate its ends. Ports 202 are in the sides of said valve above said partition, and ports 203 are in said sides below the partition. The upper end of the valve opens into chamber 184, while the lower end opens through ports 204 into chamber 185. When the valve is in its normal inoperative position, any water entering chamber 182 is free to flow through the valve into chambers 184, 185; or in the event valves 190, 191 are open, the high pressure water from inlet 188 may flow into said central chamber and out through the port 183. Valves 193, 194 would, of course, be closed to accomplish the latter. When valves 190, 191 are open the valves 193, 194 are closed, and vice versa.

The rod 197 carrying throttle valve 196 has an annularly grooved collar 205 at its upper end (Fig. 14) for engagement with the inwardly projecting pins 206 of the forked end of a bell crank 207. This crank is pivoted to a bracket 208 for up and down swinging of its forked end and for raising the rod 197 on the upward movement thereof. The end of the crank opposite its forked end carries a cam follower 209 that is adapted to engage a cam 210 that is connected with the vertically reciprocable pressure plate 5 for movement therewith. The bracket 208 is stationary and is secured to the mold jacket 3.

In operation, as the pressure plate that supports the mold forms during the upper portion of the stroke of said plate, commences its downward movement, the high portion of cam 210 will engage the follower 209 thus causing the forked end of the crank 207 to swing upwardly. The throttle valve will accordingly be raised so as to choke off the passage of water from chamber 182 through ports 202 and 204. As the water entering chamber 182 on the down stroke of the pressure plate comes from the lower end of the cylinder 7 in which piston 97 of the pressure plate ram rod 6 is reciprocable, this choking off of the water flow through the throttle valve will momentarily slow down the descent of the pressure plate. The water that passes through valve 196 will flow through open valves 193, 194 into chamber 187 and out of the same into sump 174 through line 189.

The rod 195 that carries valves 193, 194 continues downwardly through the bottom of the box 181 and into a cylinder 212. A piston 213 is secured to the lower end of said rod within said cylinder, and the latter is ported top and bottom above and below said piston for communication with conduits 214, 215. The line 214 communicates with the chamber in housing 100 that is similar to the one indicated at 112 in Fig. 3, and which chamber is under the control of cam 105 (Fig. 1); while line 214 communicates with the chamber under control of cam 106.

The pressure plate 5 carries a pair of arms 215, 216 (Fig. 14) that are forked at their outer ends to receive the rod 195 between the forked end of arm 215 and the rod 192 between the forked end of arm 216. These arms move downwardly with the pressure plate, and at about the lower end of its stroke the forked end of arm 215 will engage a collar 217 secured on said collar moving the rod 195 downwardly and closing valves 193, 194.

The cam 105 that controls the flow of high pressure water through line 215 to below the piston 213 automatically closes and said line is opened to discharge into chamber 111 just before the forked end of arm 215 engages collar 217, and cam 106 automatically opens the line 214 to high pressure water.

The rod 192 that carries valves 190, 191 also extends downwardly and outwardly of box 181 into a cylinder 218, and a piston 219 is secured to the lower end of said rod within said cylinder. A pipe line 220 extends from the upper end of cylinder 218 to the chamber similar to 112 that is controlled by cam 107, and a line 221 extends from the lower end of said cylinder and below said piston to the chamber controlled by cam 108.

Almost immediately after the valves 193, 194 are closed, the cam 108 will cause high pressure water to flow into the lower end of cylinder 218 and the cam 107 will cause line 220 to be opened to discharge into discharge chamber 111 of the control device 100. The valves 190, 191 will then be simultaneously opened and high pressure water will pass into chambers 184, 185 and through valve 196 and out of chamber 182 into the conduit 98 that leads to the bottom of cylinder 7, whereupon the pressure plate 5 will rapidly be elevated toward mold closing position.

At this point it will be explained that the previous lowering of the pressure plate also resulted in the downward and lateral outward movement of the mold form walls 61, 62, 63, 64, 65, 67. These walls, however, did not fully follow the pressure plate during its entire downward movement, but they only dropped the distance permitted by the slots 58 (Fig. 8), hence are suspended from the mold jacket ready for being pushed upward and inward as soon as the pressure plate cover 92 that is rigid with said pressure plate is elevated sufficiently to engage the lower ends of the hollow members carrying the form walls.

The slowing down of the descending pressure plate at the point where the hollow members that carry the form walls leave the pressure plate, thereby eliminating the objectionable shock that the stopping of the hollow members would otherwise cause, has been mentioned. Upon the elevating of the pressure plate, this same slowing down occurs just before the plate engages the hollow members on the upstroke by reason of the cam 210 engaging follower 209 and again causing a rocking of the crank 207 and raising of the throttle valve 196 to choke the flow of liquid therethrough.

Just before the pressure plate is at its highest point and is ready for locking of the mold together for a new cycle, the forked end of arm 216 will engage collar 225 that is secured on valve rod 192 thus closing valves 190, 191 and at the same time cam 108 will open line 221 to high pressure water and cam 107 will open line 220 to drain into the discharge chamber 111 of control device 100.

During the afore-mentioned operations of the cams 101 to 108 inclusive, the cam shaft 137 has practically made one revolution and cam 101 is about ready to cause opening of line 101 to open valve 164 and to elevate piston 12. If the pressure plate 5 is fully elevated and a fractional turn of the locking ring 39 will lock the pressure plate to the mold jacket 3, then the rotation of cams 102 and 103 for opening line 154 to high pressure water and for opening line 153 to discharge will result in the piston 226 in the hydraulic device 176 moving the arm 179 in a direction for rotating the locking ring and locking the pressure plate to the mold jacket. However, provision is made for rendering the entire apparatus inoperative should the pressure plate not be fully elevated so that the locking ring will not rotate for locking it to the mold jacket when said line 154 is opened.

The safety means above mentioned comprises a high pressure line 230 (Fig. 1) that has a needle valve or the like 231 therein for controlling the flow of water therepast to a T fitting 232. One line 233 from said T fitting leads to one end of a cylinder 234 (Figs. 1, 4); while another line 235 leads from said fitting to the upper end of a cylinder 236 (Fig. 1). The cylinder 236 is secured in any suitable manner to the mold jacket 3 and within said cylinder 236 below the point where line 236 enters the same is a ball valve 237 that is between said point and an outlet that communicates with a line 238 leading to sump 174. A ball-lift-rod 239 extends out of the lower end of cylinder 236. This rod is adapted to be lifted for raising ball 237 from its seat by rocking of a crank that is pivoted at 240 on a bracket 241 carried by said cylinder 236. One arm 242 of said crank engages said lower end of rod 239 and a counterweight 243 balances said arm for maintaining said engagement, while the second arm 244 of said crank depends therefrom and into the path of an arm 245 projecting from the locking ring 39, (Figs. 1, 11).

The cylinder 234 (Figs. 1, 4) has a piston 250 reciprocable therein, and a rod 251 secured to said piston projects from the end of the cylinder that is opposite the high pressure line 233. A spring 252 reacts between said piston and the head of the cylinder through which the piston rod projects for holding the outwardly projecting end of the rod retracted, but upon sufficient water pressure in the cylinder, the piston will be moved to project the end of the rod into the path of an angular projection 253 on dog 142 so as to throw the dog out of recess 143 upon engagement between the projection 253 and rod 251.

When the ball valve 237 is closed (Fig. 1), the pressure in the line 233 and cylinder 234 will build up for projecting the rod 251 into the path of the projection 253, but if the locking ring 39 is free to properly rotate under the high pressure admitted by action of cam 104 into the end of the hydraulic device 176, then the arm 245 on the ring will strike the arm 244 of the crank on bracket 241 thus lifting the ball 237 and relieving the pressure in cylinder 234, whereupon the rod 251 will be retracted out of the path of the projection 253 on dog 142 (Fig. 4), and the cycle of operation, starting with the admission of pulp into the mold forms and the elevating of piston 10, will be automatically repeated.

The reason for mounting the central hollow wall 75 of the mold form so that it will rise under the influence of spring 81 as soon as the pressure plate descends, is to insure freeing the container from said hollow wall. The containers can readily be lifted from the bottoms of the mold forms without injury, but there is a likelihood that any sticking to the side and bottom of the form might cause difficulty.

A machine for making the covers for the containers would differ from the one described in minor details. Fig. 2 illustrates such differences, it being seen that the mold jacket 260 need not be so deep vertically, and the bottom wall 261 may be made in different heights so as to form a shallow or deep cover as may be desired. Also, the elastic core 262 of the device may be stationary, thus simplifying the machine. Of course, relatively shallow containers may be made by the machine of Fig. 2.

It is to be understood that the ascending and descending pressure plate 5, locking ring 39, controls for the pressure plate hydraulic system and for the admission of pulp into the mold form, as well as the admission of high pressure water into the elastic cores, may be identical with those provided for the main machine. Those parts that are the same as are found in the main machine are similarly numbered.

I claim:

1. Apparatus for molding containers from pulpy fibrous material comprising a mold form having separable perforated side walls and a bottom wall, means for admitting said material into said form, an expansible and contractable core within said form for expressing moisture from said material and for compacting the latter against said side walls and said bottom wall whereby such compacted material will form the sides and bottom of the container, means for supporting said side walls for relative movement generally laterally away from each other and away from said bottom wall, and means for so moving said side walls, said means supporting said side walls including guide members extending divergently downwardly relative to each other, said side walls being four in number and there being one of said guide members for each of at least three of said side walls.

2. Apparatus for molding containers from pulpy fibrous material comprising a mold form having perforated side walls and a bottom wall, means for admitting material into said form, means for compacting the fibers in said material against the walls of said form and for expressing the moisture therefrom whereby said compacted fibers will form the sides and bottom of a container, means for separating a container so formed from said side walls, an hydraulic pressure circuit, separate means responsive for movement by the pressure of the liquid in said circuit respectively connected with said pulp admitting means, fiber compacting means and wall separating means for causing their actuation to admit pulp into said mold form, compact the fibers in said pulp and separate the container from said side walls upon admission of liquid under pressure from said conduit to said separate means, liquid control power driven means in said circuit and connected with said separate means movable for so admitting said liquid from said circuit to said separate means for moving the latter to cause actuation of said pulp admitting means, fiber compacting means and wall separating successively in that order.

3. Apparatus for molding containers from pulpy fibrous material comprising a mold form having perforated side walls and a bottom wall, means for admitting material into said form, means for compacting the fibers in said material against the walls of said form and for expressing the moisture therefrom whereby said compacted fibers will form the sides and bottom of a container, means for separating a container so formed from said side walls, an hydraulic pressure circuit, separate means responsive for movement by the pressure of the liquid in said circuit respectively connected with said pulp admitting means, fiber compacting means and wall separating means for causing their actuation to admit pulp into said mold form, compact the fibers in said pulp and separate the container from said side walls upon admission of liquid under pressure from said conduit to said separate means, liquid control power driven means in said circuit and connected with said separate means movable for so admitting said liquid from said circuit to said separate means for moving the latter to cause actuation of said pulp admitting means, fiber compacting means and wall separating successively in that order, said side walls being at least four and being separable from said bottom wall and from each other, and said means for separating a container from said side walls including guide members supporting at least three of said side walls for movement generally laterally away from each other and a vertically reciprocable platform supporting said side walls for downward movement during said lateral movement.

4. Apparatus for molding containers from pulpy fibrous material comprising a mold form having perforated side walls and a bottom wall, means for admitting material into said form, means for compacting the fibers in said material against the walls of said form and for expressing the moisture therefrom whereby said compacted fibers will form the sides and bottom of a container, means for separating a container so formed from said side walls, an hydraulic pressure circuit, separate means responsive for movement by the pressure of the liquid in said circuit respectively connected with said pulp admitting means, fiber compacting means and wall separating means for causing their actuation to admit pulp into said mold form, compact the fibers in said pulp and separate the container from said side walls upon admission of liquid under pressure from said conduit to said separate means, liquid control power driven means in said circuit and connected with said separate means movable for so admitting said liquid from said circuit to said separate means for moving the latter to cause actuation of said pulp admitting means, fiber compacting means and wall separating successively in that order, said side walls being separable from each other and from said bottom wall, means supporting said side walls for relative movement away from each other and from said bottom wall, said means for separating a container from said side walls including a vertically reciprocable ram for actuating the said means that supports said side walls, and means for positively locking said side walls together and to said bottom against separation during actuation of the said pulp admitting means and the said pulp compacting means.

5. Apparatus for molding containers from pulpy fibrous material comprising, a vertically reciprocable hydraulic ram and a horizontal perforated platform on its upper end, a vertically reciprocable hydraulically actuated piston coaxial with said ram and spaced above said platform, a plurality of adjacent pairs of perforated side walls between said piston and said platform forming the side walls of a plurality of mold forms for a plurality of containers, expansible water-impervious cores carried by said piston positioned for extending into each of said forms, means for tightly locking said piston, platform and side walls together, means for admitting said pulpy material into said mold forms when the latter are so locked together, means for admitting liquid under pressure into said cores after said pulpy material is admitted into said forms for expanding said cores and for compacting said fibers against said platform and side walls to form the sides and bottoms of containers, and means for releasing said platform and mold forms from said piston and from each other after said fibers have been so compacted for removal of the containers formed by the compacted fibers.

6. Apparatus for molding containers from pulpy fibrous material comprising, a vertically reciprocable hydraulic ram and a horizontal perforated platform on its upper end, a vertically reciprocable hydraulically actuated piston coaxial with said ram and spaced above said platform, a plurality of adjacent pairs of perforated side walls between said piston and said platform forming the side walls of a plurality of mold forms for a plurality of containers, expansible water-impervious cores carried by said piston positioned for extending into each of said forms, means for tightly locking said piston, platform and side walls together, means for admitting said pulpy material into said mold forms when the latter are so locked together, means for admitting liquid under pressure into said cores after said pulpy material is admitted into said forms for expanding said cores and for compacting said fibers against said platform and side walls to form the sides and bottoms of containers, and means for releasing said platform and mold forms from said piston and from each other after said fibers have been so compacted for removal of the containers formed by the compacted fibers, said last mentioned means including a housing enclosing said piston and said side walls and a locking member carried by said platform movable into and out of locking engagement with said housing at the top of the movement of said ram.

7. A machine for molding containers from pulpy fibrous material comprising a perforated platform provided with an upstanding hollow wall having perforated sides, a plurality of vertical perforated side walls at opposite sides of said hollow wall arranged to coact with said sides for forming rectangular sided mold forms at opposite sides of said hollow wall with said sides of the hollow wall forming one of the sides of each such form, said side walls being separable from said platform and supported thereon when said side walls are together with said hollow wall for forming said forms, means supporting said platform for vertical reciprocation, means for carrying said side walls away from each other and away from said hollow wall during downward movement of said platform, means for moving said hollow wall relative to said platform and side walls during said downward movement, and means supporting said hollow wall for said movement.

8. A machine for molding containers from pulpy fibrous material comprising a perforated platform provided with an upstanding, hollow wall having perforated sides, a plurality of vertical perforated side walls at opposite sides of said hollow wall arranged to coact with said sides for forming rectangular sided mold forms at opposite sides of said hollow wall with said sides of the hollow wall forming one of the sides of each such form, said side walls being separable from said platform and supported thereon when said side walls are together with said hollow wall for forming said forms, means supporting said platform for vertical reciprocation, means for carrying said side walls away from each other and away from said hollow wall during downward movement of said platform, means for moving said hollow wall relative to said platform and side walls during said downward movement, and means supporting said hollow wall for said movement, said last-mentioned means being connected with said platform for reciprocable movement therewith.

9. A machine for molding containers from pulpy fibrous material comprising a perforated platform provided with an upstanding, hollow wall having perforated sides, a plurality of vertical perforated side walls at opposite sides of said hollow wall arranged to coact with said sides for forming rectangular sided mold forms at opposite sides of said hollow wall with said sides of the hollow wall forming one of the sides of each such form, said side wall being separable from said platform and supported thereon when said side walls are together with said hollow wall for forming said forms, means supporting said platform for vertical reciprocation, means for carrying said side walls away from each other and away from said hollow wall during downward movement of said platform, means for moving said hollow wall relative to said platform and side walls during said downward movement, and means supporting said hollow wall for said movement, the said means for carrying said side walls being separate from said platform, and said platform being movable on its downward stroke entirely clear of said side walls to a level a substantial distance below the lower edges thereof.

10. A machine for molding containers from pulpy fibrous material comprising a perforated platform provided with an upstanding hollow wall having perforated sides, a plurality of vertical perforated side walls at opposite sides of said hollow wall arranged to coact with said sides for forming rectangular sided mold forms at opposite sides of said hollow wall with said sides of the hollow wall forming one of the sides of each such form, said side walls being separable from said platform and supported thereon when said side walls are together with said hollow wall for forming said forms, means supporting said platform for vertical reciprocation, means for carrying said side walls away from each other and away from said hollow wall during downward movement of said platform, means for moving said hollow wall relative to said platform and side walls during said downward movement, and means supporting said hollow wall for said movement, means for admitting said material into said forms and for compacting the fibers against the walls thereof, and means for rendering said pulp admitting means inoperative until said side walls and hollow wall and platform are tightly together for forming said forms.

11. Apparatus for molding containers from pulpy fibrous materials comprising, a mold form having separable perforated side walls and a bottom wall, means for admitting said material into said form, an expansible and contractable core within said form and separable from the latter for compacting the fibers in said material against said side walls and said bottom wall and for expressing moisture therefrom, means supporting said side walls for relative movement away from each other and from said bottom wall and core, means for so moving said side walls, releasable locking means for positively locking said side walls together and to said bottom wall during admission of pulp into said form and during expansion of said core, means actuated by said locking means for rendering said pulp admitting means and said core expanding means inoperable when said locking means is released.

12. Apparatus for molding containers from pulpy fibrous material comprising, a mold form having separable perforated side walls and a bottom wall, means for admitting said material into said form, an expansible and contractable core within said form and separable from the latter for compacting the fibers in said material against said side walls and said bottom wall and for expressing moisture therefrom, means supporting said side walls for relative movement away from each other and from said bottom wall and core, means for so moving said side walls, releasable locking means for positively locking said side walls together and to said bottom wall during admission of pulp into said form and during expansion of said core, means actuated by said locking means for rendering said pulp admitting means and said core expanding means inoperable when said locking means is released, said pulp admitting means, core, side wall supporting means and locking means being hydraulically actuated and a main control means including a high pressure fluid inlet and valved outlet conduits extending to said several means for causing actuation of said several means in a predetermined order, a motor for actuating said control means.

13. Apparatus for molding containers from pulpy fibrous materials comprising, a mold form having separable perforated side walls and a bottom wall, means for admitting said material into said form, an expansible and contractable core within said form and separable from the latter for compacting the fibers in said material against said side walls and said bottom wall and for expressing moisture therefrom, means supporting said side walls for relative movement away from each other and from said bottom wall and core, means for so moving said side walls, releasable locking means for positively locking said side walls together and to said bottom wall during admission of pulp into said form and during expansion of said core, means actuated by said locking means for rendering said pulp admitting means and said core expanding means inoperable when said locking means is released, said pulp admitting means, core, side wall supporting means and locking means being fluid actuated, and a plurality of cam actuated valves for controlling the fluid that actuates said several means so that the actuation of said several means will be in a predetermined order and for predetermined periods of time.

HARVEY R. DENTON.

REFERENCES CITED

The following references are of record in the file of this patent:

UNITED STATES PATENTS

| Number | Name | Date |
| --- | --- | --- |
| 398,397 | Howard | Feb. 26, 1889 |
| 954,962 | Homburg | Apr. 12, 1910 |
| 958,019 | Shackleton | May 17, 1910 |

FOREIGN PATENTS

| Number | Country | Date |
| --- | --- | --- |
| 586,156 | Germany | Oct. 26, 1933 |